United States Patent Office 3,630,893
Patented Dec. 28, 1971

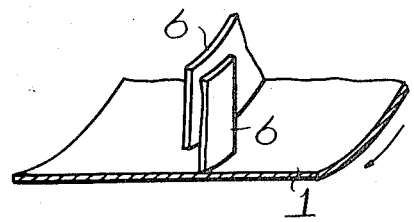
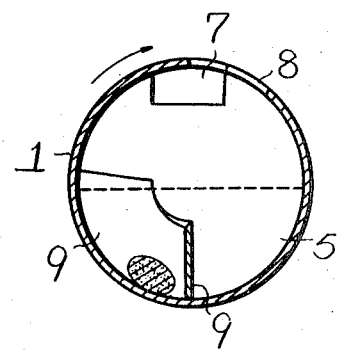
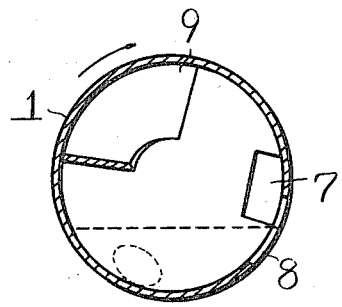
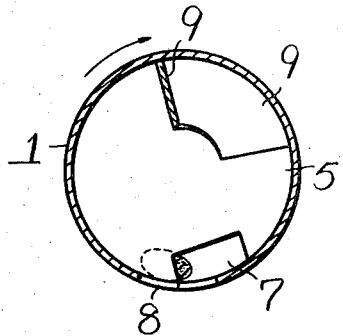
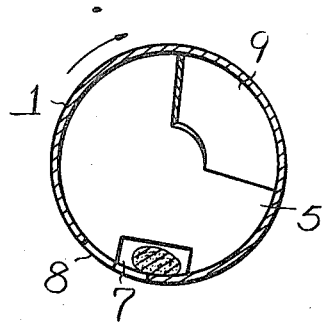

3,630,893
METHOD OF CONCENTRATING AND HYDRO-EXTRACTING SUSPENSIONS
Shigemasa Tanada and Hidetomo Suzuki, Tokyo, Japan, assignors to Ebara Infilco Kabushiki Kaisha, Tokyo-to, Japan
Filed Apr. 6, 1970, Ser. No. 25,679
Claims priority, application Japan, June 18, 1969, 44/48,032; July 18, 1969, 44/56,868; Sept. 8, 1969, 44/85,182
Int. Cl. B01d 21/01, 21/26
U.S. Cl. 210—49       5 Claims

ABSTRACT OF THE DISCLOSURE

According to this invention, cakes can be obtained from suspensions without the use of a centrifugal separator, vacuum hydroextractor or pressure hydroextractor. This problem is solved as a rolling motion is imparted to a solid matter suspended in liquid thereby to move the suspended solid matter while granulating or lumping the same, and the suspension is reasonably separated into a cake and liquid, say water, by taking the advantage of the difference between the imparted motion of the solid matter and the motion of the liquid.

STATE OF THE ART

Usually separation and hydroextraction of the suspended matter from a suspension are accomplished by first settling the solid matter by natural precipitation or flocculation and then extracting water from the precipitate as by centrifugation, filtration or hydroextracting in vacuum or under pressure. These hydroextracting methods call for centrifuges, vacuum hydroextractors, pressure hydroextractors and other apparatus which are very costly and demand great skill in the operation, maintenance and control. The conventional methods have therefore involved a number of problems from the viewpoints of economy and hydrextracting efficjency. In order, for example, to separate, hydroextract, and cake a solid matter of particles less than several microns in diameter from a liquid, it is a usual practice to add slaked lime or other filtration promoter to the suspension thereby to increase the filtration rate for the purpose of hydroextraction. In such a case, however, the filter cloth of the hydroextracting filter tends to be choked and must be washed clean with acid or the like at intervals of only 10 to 20 days of operation. High-molecular compounds added as filtration promoters would have little beneficial effects upon the filtration rates. Much has therefore been desired of the conventional methods in relation to the investment cost, operation, maintenance and control of the apparatus.

SUMMARY OF THE INVENTION

This invention is characterized by accomplishment of concentration and hydroextraction of suspensions by an apparatus including a cylindrical vessel capable of holding a suspension containing a flocculating agent and which is adapted to rotate while maintaining the suspension substantially at a level, comprising means whereby the solid matter in the suspension admitted into the vessel is imparted with a rolling motion and is thereby granulated or lumped, means to convey the resulting granules or lumps toward one end of said cylindrical vessel, means for producing a difference between the motions of the lumpy solid matter and the liquid in said rotary cylindrical vessel, and means for further rolling said solid matter for separation of the solid matter from the liquid into the form of a cake and effectively extracting water from the resulting cake.

DETAILED DESCRIPTION OF THE INVENTION

This invention relates to a method and apparatus for concentrating, separating and hydroextracting the suspended solid matter from a liquid that contains the same (to be simply called a suspension hereinafter).

It is an object of the present invention to provide, in an economical way, a method and apparatus for concentration and hydroextraction which can effectively eliminate the foregoing disadvantages of the conventional processes and equipment.

Another object of the invention is to provide means for separating the suspended solid matter from a suspension and hydroextracting the same to a cake form in a very simple fashion by taking advantage of changes in the properties of the suspended solid matter in a rotary cylindrical vessel and the consequent difference between the motions of the suspended solid matter and the liquid in the rotary cylindrical vessel.

Still another object of the invention is to make it possible, in a most simplified way, to concentrate and hydroextract the suspended matter containing fine particles thereby directly separating the solid matter in the form of granules or lumps from the liquid and discharging the same as a cake, by an apparatus of a remarkably simplified construction.

In accordance with the present invention, settling and rolling motions are imparted to the solid matter in suspension in the process of adding a high-molecular compound to the suspension and flowing the suspension through a rotary vessel, so that said suspended solid matter is caked and the suspended matter is effectively concentrated, hydroextracted, and separated by making most of the difference between the motions of the separated liquid and cake. This permits subsequent treatments to be performed easily and economically. Moreover, the hydroextraction is accomplished most efficiency, thus making possible an increase of the processing capacity.

Also, under the invention, there is no need of a complicated and expensive hydroextractor which is otherwise required by conventional processes for the concentration, separation and hydroextraction of the suspended solid matter from a suspension to be treated. A cylindrical vesciency and in the water content of the resulting cake. In stead, to separate the suspended solid matter and the liquid automatically from each other and obtain the solid matter in the form of a cake. In this way the disadvantages of the existing methods and apparatus can be adequately eliminated, and remarkable improvements are attained over the prior art methods in respect of the separating efficiency and in the water content of the resulting cake. In addition, the processing operation is made safer and simpler.

In the practice of the invention, the hydroextraction of the solid matter following the granulation or lumping is accomplished to form a cake of a high degree of hydroextraction by an apparatus consisting of extremely simplified and inexpensive component parts. The operation and control of the apparatus are greatly simplified for the convenience in handling of the cakes for transportation, burying or other subsequent treatments.

Further, in conformity to this invention, the processing operation is continuously carried out on a single rotary cylindrical vessel, with continuous feed of a suspension. The operation is safe, simple and streamlined. Moreover, the apparatus is easy and economical to fabricate. Altogether, these features render the present invention highly beneficial for practical applications.

In the accompanying drawings illustrating preferred embodiments of the invention:

FIG. 6 is an enlarged perspective view of the part A of FIG. 5;

FIGS. 7 to 10 are cross sectional views taken along the line I—I of FIG. 5, all explanatory of the principles of the invention;

Figure 1:
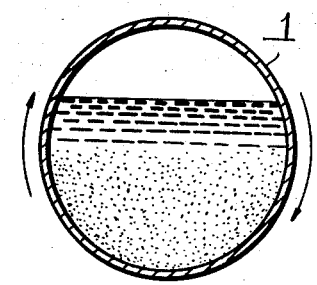
FIGS. 1 to 4 are cross sectional views of a cylindrical vessel partly filled with a suspension, all explanatory of the principles of the invention in connection with an embodiment thereof.
Figure 2:
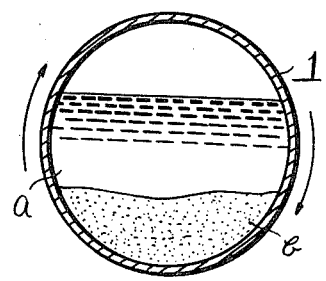
Figure 3:
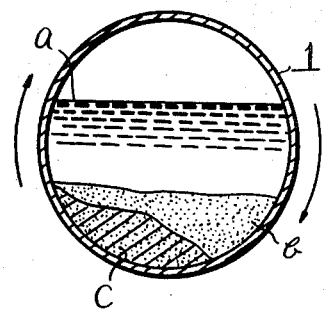
Figure 4:
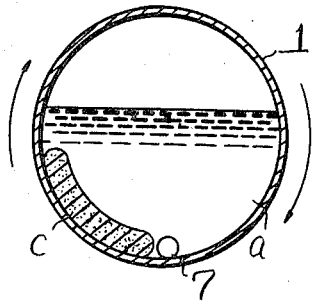

The hydroextraction method according to this invention will now be described with reference to the accompanying drawings. In the first place, let us observe how a suspension after the addition of a flocculating agent such as a high-molecular compound is processed in a rotary cylindrical vessel 1 into a cake. Immediately after the addition of a high-molecular compound the suspended solid matter flocculates as shown in FIG. 1. The solid matter precipitates in the form of a flock, whereby the suspension is separated into a settled liquid $a$ and a flock $b$ as in FIG. 2. As the cylindrical vessel 1 is rotated to impart a rolling motion to the flock, the latter is gradually converted to a granular or cake-like mass from the portion facing the surrounding wall of the cylindrical vessel 1 (FIG. 3) until the flock as a whole becomes a cake $c$. As long as the suspended solid matter remains flocculent it flows like the liquid as the latter is flown with respect to the running vessel. However, once the suspended matter has become a cake, it undergoes a motion unlike the flow of the liquid. The tendency now is that the cake is raised toward the direction of rotation along the surrounding wall of the cylindrical vessel 1 (FIG. 4). If the rotary vessel 1 is provided with an outlet port 7 as shown in FIG. 4, the liquid is allowed to flow out gravitationally, while the solid matter in the cake form, which is raised above the outlet port 7, is kept from flowing out and is left as separated. After the liquid has flown out, the cake $c$ is removed. In this manner, while the suspension is passing through the rotary cylindrical vessel 1, the solid matter in suspension is caked, and by utilizing the different motions of the resulting cake and the liquid the solid matter and the liquid can be easily separated out.

The correlations among the rotation of the rotary cylindrical vessel 1 and the position of the outlet port 7 and the timing for the discharge of the liquid and the cake in accordance with the present invention will now be explained in conjunction with an embodiment of the invention.

An apparatus for hydroextraction according to the method of the invention is generally of the following construction. A cylindrical vessel 1 having an inlet port 2 at one end and a discharge opening 4 for the cake $c$ at the other end is rotatably supported substantially horizontally. The portion of the vessel near the discharge opening 4 is partitioned by an end wall 5 into a section $m$ for conveying a suspension and a section $n$ for separating out the liquid. Along the inner wall of the conveying section $m$ are fixed combined partition-conveying plates 6. The end plate 5 is formed with an outlet port 7 at a part of the periphery, and a discharge port 8 for the liquid is formed through the inner wall of the solid-liquid separating section on the side of the running direction of the outlet port 7, in such a manner that the cake can be led out through the liquid separating section $n$. The rotary vessel 1 consists of a round- or polygonally-shaped rotatable cylindrical vessel with a rotary shaft held substantially horizontally. It is formed at one end with an inlet port 2 for the suspension to which an inlet pipe 2 is connected, while the other end serves as a discharge end 4 for the granular or lumpy mass (cake) of the suspended matter. An end wall 5 provided inwardly of the cake discharge end 4 of the rotary vessel 1 divides the vessel into a suspension-conveying section $m$ and a liquid separating section $n$. Along the inner wall of the conveying section $m$ are provided helical conveying plates 6 which combine partition plates. As shown in FIG. 6, the conveying plates 6 are cut to suitable lengths and are arranged in a discontinuous or staggered fashion. The end wall 5 is formed with an outlet port 7 at one part of the periphery, and the inner wall of the separating section $n$ is formed with a discharge outlet 8 for the liquid on the side of the rotating direction, and also a guide plate 9 for the discharge of the cake is provided which is inclined downward toward the running direction of the vessel.

The guide plate 9 may be freely shaped so as to meet the particular requirement by suitably screening the discharge outlet 8. It is also possible to replace the guide plate 9 by a conically-shaped separating section $n$ whereby the cake $c$ can be conveniently led out.

If necessary, the rotary vessel 1 as a whole may take the form of a cone.

A suspension after the addition of a high-molecular compound is fed via the inlet pipe 3 and through the inlet port 2 into the conveying section $m$ of the rotating vessel 1. The suspended matter which has already begun flocculating and separating from the liquid rolls along the inner wall of the vessel 1 as the latter rotates. With the continuation of the rolling motion, the suspended matter first takes the form of a flock $b$ and then gradually forms a cake $c$ of strong and big granules or lumps. Throughout the process the solid matter separated from the liquid is carried forward in succession by the conveying plates 6 toward the end wall 5.

On the other hand, the liquid is conveyed through the outlet port 7 of the end wall 5 into the separating section $n$, wherein it is separated from the cake and flown out through the discharge outlet 8. While the outlet port 7 is kept in the upper portion by the rotation of the rotary vessel 1 as shown in FIG. 7, the liquid in the conveying section $m$ is not discharged into the separating section $n$, but is held in position as indicated by a dotted line. Gradually with the rotation of the vessel 1 the outlet port 7 comes down as in FIG. 8, when the liquid is allowed to flow through the outlet port 7 into the separating section $n$ and, at the same time, drop through the discharge outlet 8 to the outside. At this point the cake $c$ remains deposited on the bottom and the liquid $a$ alone is discharged. As the vessel 1 further rotates and the outlet port 7 comes to the lower portion as shown in FIG. 9, the liquid is almost completely discharged, leaving only the cake $c$ behind. In the position shown in FIG. 10, the cake $c$ is discharged by the conveying plates 6 into the separating section $n$ through the outlet port 7. Here the discharge outlet 8 is no longer thereunder, and the cake $c$ is held on the wall. By the rotation of the vessel 1 the cake $c$ is rolled down from the base of the guide plate 9 axially to the outside. In this way the liquid $a$ is separately flown down, while the cake $c$ is guided axially of the vessel and the suspended matter in the liquid is directly concentrated and led out in the form of granules or lumps.

The concentration-hydroextraction treatment according to the method of the invention was experimented with two different liquid-solid mixtures A and B and results as shown in the table given below were obtained.

The apparatus used included a rotary cylindrical vessel 300 mm. in diameter and 1000 mm. in length. The solid contents of the test liquids A and B were such that they could be concentrated to moisture contents of only 79 and 90 percent, respectively, after standing for a lengthy period of time. When slaked lime $Ca(OH)_2$ was added as a filter aid to the test liquid A as in conventional process at a rate of 10% by weight of the weight of the solid matter contained therein and the mixture was hydroextracted by a vacuum hydroextractor, the moisture content of the cake was about 50 percent. The hydroextraction rate was 6.0 kg.-dry solid/m.² hr.

The test liquid A had a solid matter concentration of 100 g./l. and contained 0.5 mg. of a high-molecular compound (acrylamide) per gram of the solid matter. It was fed at a rate of 60 l./hr. into the rotary vessel 1 from one end thereof, and the solid matter was imparted with a rolling motion in the cylindrical vessel 1 to form a cake. The cake was then separated by taking the advantage of the difference between the motions of the cake and the liquid. The cake had a moisture content of 51 percent and the separation efficiency of the solid matter was 96 percent.

TABLE

| | Test liquid | |
|---|---|---|
| | A | B |
| Test liquid: | | |
| Type of solid matter | Fine particles of clay and organic matter. | Fine particles of clay, organic matter, and metallic hydroxides. |
| Solid matter conc. (g./l.) | 100 | 50. |
| Feed rate (l./h.) | 60 | 60. |
| High-molecular compound: | | |
| Type | Acrylamide, powder | Acrylamide, powder. |
| Amount added (mg./g. solid) | 0.5 | 0.7. |
| Cylindrical vessel: | | |
| Shape | Lateral, cylindrical | Lateral, cylindrical. |
| Size (mm.) | 300 mm. dia. x 1,000 mm. L. | 300 mm. dia. x 1,000 mm. L. |
| Results: | | |
| Rotational speed (r.p.m.) | ½ | 1. |
| Solids separating efficiency (percent) | 96 | 97. |
| Cake moisture content (percent) | 51 | 61. |

When tested in the similar way the test liquid B showed a moisture content of 61 percent and a separation efficiency of 97 percent. (See the table.)

Figure 11:
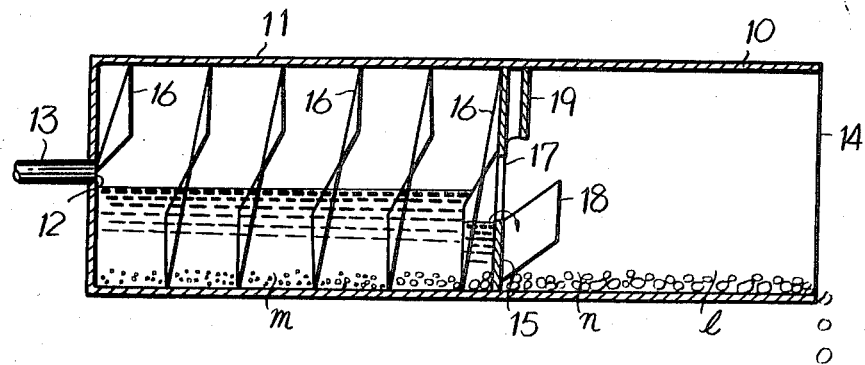
FIG. 11 is a longitudinal sectional view of another embodiment of the invention.
Figure 12:
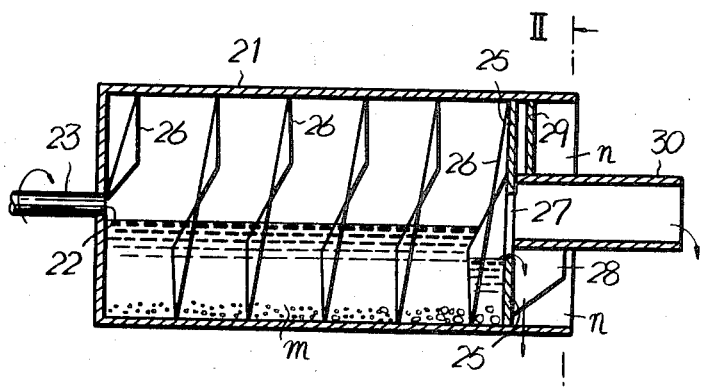
FIG. 12 is a longitudinal sectional view of yet another embodiment of the invention.
Figure 13:
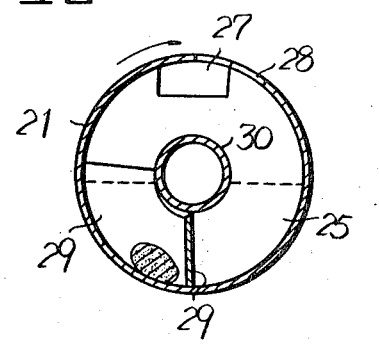
FIGS. 13 to 16 are cross sectional views taken along the line II—II of FIG. 12, all explanatory of the principles of the invention.
Figure 14:
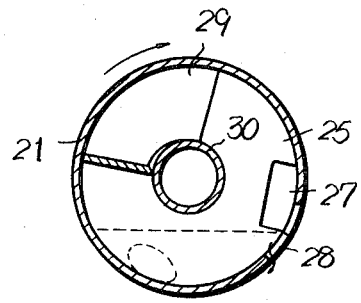
Figure 15:
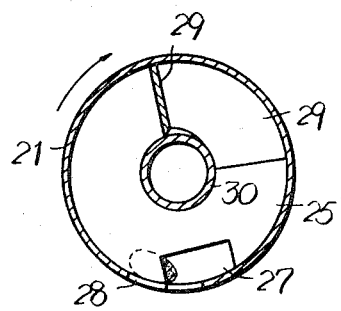
Figure 16:
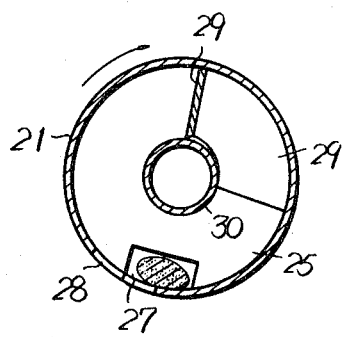

In the embodiment shown in FIG. 11 an apparatus is used in which a cylindrical vessel 11 provided at one end with an inlet port 12 in communication with an inlet pipe 13 for a suspension and at the other end with a discharge end 14 for the cake c is partitioned inside about midway of the length by a barrier wall 15, into a suspension conveying section m and a liquid separating section n. Along the inner wall of the conveying section m are fixed combined partition-conveying plates 16. The barrier wall 15 is formed with an outlet port 17 in a part of the periphery, and a discharge outlet 18 for the liquid is formed in the inner wall of the solid-liquid separating section on the side of the rotating direction of the outlet 17. At the same time, the liquid separating section n is adapted to discharge the cake therethrough. Further, the hydroextracting section l is formed of a cylindrical body 10 of a porous of hydroscopic circular wall.

The cake that is separated out from the liquid in the liquid separating section n of the rotary cylindrical section n is somehow shaped as such, but because it is simply formed by rolling in water, the cake just after separation from the liquid still contains water and exhibits a relatively high water content. In this case a rolling motion is slowly given in the rotary cylinder 10 to the cake separated from the liquid in order to remove water therefrom, whereby conveniently a very great gravitational hydroextracting effect is achieved by the cake's own weight and the moisture content of the cake can be further reduced.

Figure 5:
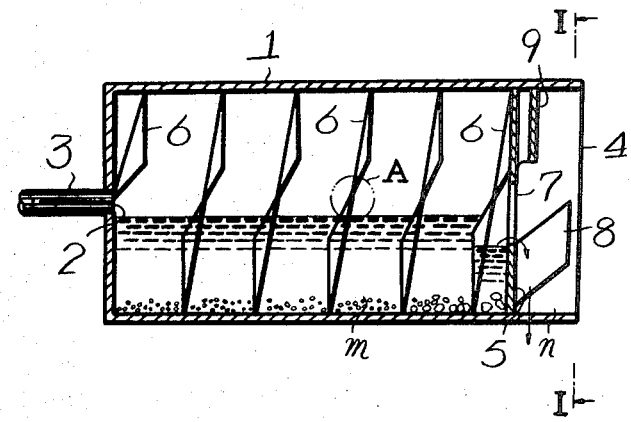
FIG. 5 is a longitudinal sectional view of the vessel in operation.

Like the embodiment shown in FIG. 5, the barrier wall 5 is formed with an outlet port 17 at a part of the periphery. The inner wall of the separating section n is formed with a discharge outlet 18 for the liquid on the side of the rotating direction of the outlet port 17, and also there is provided a conveying plate 19 for the cake which is inclined downward toward the rotating direction.

For the conveying plate 19 any desired shape may be chosen by screening the discharge outlet 18. It is also possible to dispense with the conveying plate 19 and make the separating section n conically-shaped so that the cake c can be naturally led out. If necessary, the rotary vessel 11 may be shaped generally conically. The cylinder 10 may be equally provided with conveying plates or compression plates in a helical or discontinuous arrangement.

In the embodiment under consideration, the cake immediately after separation from the liquid in the vicinity of the separating section n of the rotary vessel 11 is slowly rolled in the hydroextracting section l, so that the cake is deprived of its water content. The conveyance of the cake from the separating section n to the discharge end is accomplished with ease through the provision of suitable conveying plates on the inner wall of the hydroextracting section l, or by tilting the rotary cylindrical vessel 1, or by making the hydroextracting section l conically-shaped. The water extracted from the cake in the hydroextracting section l can be separated from the cake by having the hydroextracting section l conically-shaped or by forming some holes in the surrounding wall of the same section, the holes being small enough to avoid dropping of the cake to the outside therethrough. In these cases, the experiments with the test liquid A under the conditions given in the table showed that the water content of the cake in the neighborhood of the separating section was 51%, the water content of the cake at the discharge end 4 for the cake was 44%, and the solid separating efficiency attained was 96%. Similar values obtained with the test liquid B were: the moisture content of the cake near the separating section n was 61%, the moisture content of the cake at the discharge end 4 for the cake was 55%, and the separation efficiency was 97%.

In the embodiment illustrated in FIGS. 12 to 16, a rotary vessel 21 having an inlet port 22 at one end in communication with an inlet pipe 23 for a suspension and also having a discharge end 24 for the cake c at the other end, is divided by a barrier wall 25 into a suspension conveying section m and a liquid separating section n, the conveying section m being provided with helical conveying plates 26 along the inner wall thereof. The barrier wall 25 is formed with an outlet port 27 at a part of the periphery, and the inner wall of the separating section n is formed with a discharge outlet 28 for the liquid on the side of the rotating direction of the outlet port 27. Further, a guide plate 29 inclined downward in the rotating direction is provided to facilitate the discharging of the cake. Through the center of the barrier wall 25 is provided an overflow pipe 30 for removing the supernatant fluid (separated liquid) from the suspension conveying section m. This overflow pipe 30 is larger in diameter than the inlet pipe 23.

In this embodiment, the process of cake formation inside the rotary cylindrical vessel 21 takes place in the same way as in the embodiments already described. The liquid is separated and flown out of the vessel 21 through the discharge outlet 28, while the cake is led out axially of the vessel, so that the suspended matter in the liquid is directly concentrated and led out in the granular or lumpy form. Meanwhile, in the suspension conveying section m, the suspended matter is still in the course of settling in the proximity of the inlet port 22 and the supernatant fluid there is not clear enough. But while it is being urged toward the barrier plate 25 by means of the conveying plates 26, the suspended matter is allowed to settle, gradually taking the form of granules or lumps. The supernatant fluid, on the other hand, is sufficiently clarified in this way and is mostly discharged from the vessel through the overflow pipe 30.

The reasons for the existence of this overflow pipe 30 will now be explained. If there is no overflow pipe 30, the liquid separated from the suspension and the suspended matter in the form of granules or lumps are discharged altogether through the outlet port 27. In this case, the larger the volume of the separated liquid that is discharged together with the caked suspended matter, the lower the efficiency with which the suspension is separated into the cake and the liquid. Hence the less the amount of the separated liquid flown out of the outlet port 27 the better. It is also noted that inside the suspension conveying section $m$ the cake is conveyed by means of the conveying plates 26 and therefore the size of the conveying plates 26 and the rotational speed of the rotary vessel 21 determined the cake conveying capacity or processing capacity of the apparatus. If in this case the barrier well 25 is provided with the overflow pipe 30, most of the separated liquid is easily taken out through the overflow pipe 30, whereas a preponderance of cake and some separated liquid are led out through the outlet port 27. As will be understood from the foregoing, the presence of the overflow pipe 30 enables the conveying plates 26 to serve principally as conveying means for the cake, with the result that the conveying capacity or the processing capacity of the apparatus is accordingly increased. Furthermore, the water level in the conveying section $m$ is kept constant by the overflow pipe 30 and a very stabilized operation is ensured. Because the outlet port 27 is used almost solely for the discharge of the cake, a high efficiency is attained in separating the suspension into the cake and the liquid.

What is claimed is:

1. A method of concentrating and hydroextracting suspensions which comprises adding a high-molecular weight flocculating agent to a liquid that contains a solid matter in suspension, feeding the suspension into a substantially horizontal rotatable cylindrical vessel from one end thereof, rotating said vessel at a rate such that a rolling motion is imparted to the suspended solid matter while the latter is in the course of settling inside the cylindrical vessel, conveying the solid matter to the other end of the vessel while transforming the same into a granular or cake form, and then separating the cake and the liquid by taking advantage of the difference between the motions of the caked solid matter and the liquid in the vicinity of the latter end of the rotary cylindrical vessel.

2. A method of concentrating and hydroextracting suspensions which comprises adding a high molecular weight flocculating agent to a suspension, feeding the suspension into a substantially horizontal rotatable cylindrical vessel, rotating said vessel at a rate such that a rolling motion is imparted to the suspended solid matter while the latter is in the course of settling inside the cylindrical vessel, conveying the solid matter to the other end of the vessel while transforming the same into a granular or cake form, separating the cake and the liquid by taking advantage of the difference between the motions of the caked solid matter and the liquid in the intermediate portion of the cylindrical vessel, and then further rolling the cake inside the vessel thereby accomplishing hydroextraction of the cake.

3. Method as defined in claim 1, wherein said caked solid matter is positioned proximate the bottom of said vessel and said separation of said cake and said liquid comprises the steps of rotating into said liquid an aperture proximate the periphery of a partition dividing said vessel into a suspension-conveying and a separating section, simultaneously rotating a port in said separating section wall proximate said partition in advance of said aperture whereby liquid flowing out of said aperture may also flow through said port to the exterior of said vessel, further rotating said aperture toward its lowest position, thereby providing for egress of said caked solid matter into said separating section, and simultaneously rotating said port upwardly, thereby preventing egress of said solid matter through said port and effecting separation of said solid matter from said liquid.

4. Method as defined in claim 1, wherein the vessel is rotated at a rate such that the peripheral speed is about 0.5 m./min.

5. Method as defined in claim 3, further comprising the step of removal of a substantial portion of said liquid through an axial vent in said partition.

References Cited

UNITED STATES PATENTS

| | | | |
|---|---|---|---|
| 2,190,596 | 2/1940 | Dorr | 210—49 |
| 2,382,605 | 8/1945 | Carter | 210—49 X |
| 3,442,495 | 5/1969 | Schreiber | 210—17 X |
| 3,506,536 | 4/1970 | Jacquelin | 210—49 X |

REUBEN FRIEDMAN, Primary Examiner

T. G. WYSE, Assistant Examiner

U.S. Cl. X.R.

210—78, 210